(12) United States Patent
Taniguchi et al.

(10) Patent No.: US 6,504,812 B2
(45) Date of Patent: Jan. 7, 2003

(54) OPTICAL PICKUP DEVICE WITH A PLURALITY OF LASER COUPLERS

(75) Inventors: Tadashi Taniguchi, Chiba (JP); Chiaki Kojima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/037,011

(22) Filed: Dec. 31, 2001

(65) Prior Publication Data

US 2002/0060976 A1 May 23, 2002

Related U.S. Application Data

(62) Division of application No. 09/675,074, filed on Sep. 28, 2000.

(30) Foreign Application Priority Data

May 27, 1996 (JP) .......................................... P08-154839

(51) Int. Cl.$^7$ .................................................. G11B 7/00
(52) U.S. Cl. ................ 369/121; 369/112.2; 369/112.21
(58) Field of Search ........................ 369/44.23, 44.24, 369/44.12, 112.2, 112.01, 112.17, 112.21, 122.23, 112.29, 121

(56) References Cited

U.S. PATENT DOCUMENTS

| | | | |
|---|---|---|---|
| 5,446,565 A | * 8/1995 | Komma et al. ............. 369/112 |
| 5,598,394 A | 1/1997 | Hibbino et al. ............. 369/112 |
| 5,682,373 A | 10/1997 | Kim ............................ 369/112 |
| 5,684,781 A | 11/1997 | Jeong ......................... 369/112 |
| 5,703,856 A | 12/1997 | Hayashi et al. ............... 369/54 |
| 5,703,863 A | 12/1997 | Doi et al. .................... 369/112 |
| 5,715,227 A | 2/1998 | Matsumoto ................. 369/112 |
| 5,901,132 A | 5/1999 | Choi ........................... 369/124 |

FOREIGN PATENT DOCUMENTS

| | | |
|---|---|---|
| EP | 0372365 | 6/1990 |
| EP | 0545905 | 6/1993 |
| EP | 0550036 | 7/1993 |
| EP | 470807 | 8/1994 |
| JP | 01154326 | 6/1989 |
| JP | 02192044 | 7/1990 |

* cited by examiner

*Primary Examiner*—Nabil Hindi
(74) *Attorney, Agent, or Firm*—Sonnenschein, Nath & Rosenthal

(57) ABSTRACT

An optical pickup device with the capability to read data from and write data to different kinds of optical discs in different formats and a composite optical device used in the optical pickup device. An optical pickup device is made by combining two laser couplers LC1 and LC2 that are designed for optimum read/write specifications for optical discs which are different in format from each other. In one embodiment, two laser couplers LC1 and LC2 are incorporated on a common photodiode IC to form a single laser coupler, and the laser coupler is used in an optical pickup device.

29 Claims, 11 Drawing Sheets

OPTICAL PICKUP DEVICE WITH A PLURALITY OF LASER COUPLERS

RELATED APPLICATION DATA

This application claims priority to Japanese Application No. PO8-154839, filed May 27, 1996, and is a divisional of U.S. application Ser. No. 09/675,074, filed Sep. 28, 2000, each of which is incorporated herein by reference to the extent permitted by law.

BACKGROUND OF THE INVENTION

The invention relates to optical pickup devices and composite optical devices especially suitable for use in an optical disc system.

Along with the recent diversification of optical disc systems, there has been an increase in incompatible optical discs using what are referred to herein as different read/write formats (or simply formats) (for example, CD, CD-R, MD, MO, Phase Change Disc DVD, and so on). These read/write formats can very, e.g., by using laser light from a semiconductor laser for emitting light in the band of 780 nm, laser light from an emitting semiconductor laser for emitting red light in the band of 635 nm (or 650 nm), laser light from a semiconductor laser for emitting blue light, and so forth. The optical pickup devices used to read from and write to these different optical recording media then have what are referred to herein as different read/write specifications.

In order to use a common optical disc system to record and reproduce signals wit different kinds of optical discs having different formats, a system needs different optical pickup devices for respective optical discs having different read/write formats.

On the other hand, considering the large differences in purpose and characteristics between writing semiconductor lasers and reading semiconductor lasers, it would be easier for making an optical pickup device, in some applications, to use a semiconductor laser only for writing and another semiconductor laser for reading.

However, the use of different optical pickup devices for respective optical discs of different formats invites an increase in the dimensions and cost of the optical disc system. Especially when a packaged writing semiconductor laser and a packaged reading semiconductor laser are used to make up an optical pickup device, the optical pickup device itself, and an optical disc system using it, become more bulky. At the same time, these semiconductor lasers and photodetector elements are difficult to assemble because adjustment of their optical axes is more difficult than conventional devices.

SUMMARY OF THE INVENTION

It is, therefore, an object of the invention to provide an optical pickup device that can be used for both reading from and writing to different kinds of optical discs having different read/write formats, and yet has a small-scaled, easily assembled structure.

Another object of the invention is to provide a composite optical device that can be used for both reading from and writing to different kinds of optical discs having different read/write formats when used in an optical pickup device, and contributes to miniaturization and easier assembly of the optical pickup device.

According to a first aspect of the invention, there is provided an optical pickup device comprising:
a plurality of a composite optical devices, each having a light emitting element, a photodetector element and a transparent optical element with a partial reflective plane that are supported on a base body, the composite optical devices having different read/write specifications..

Typically, the light emitting elements are different from each other in light emitting wavelength and/or optical output power. Each light emitting element, photodetector element and transparent optical element typically is arranged so that the optical axis of exist light from the light emitting element and the optical axis of incident light to the photodetector element substantially coincide on the partial reflective plane of the transparent optical element.

According to another aspect of the invention, there is provided a composite optical device comprising:
a plurality of light emitting elements, a photodetector element and a transparent optical element having a partial reflective plane that are provided on a base body, the light emitting elements having different read/write specifications.

Typically, the light emitting elements are different from each other in light emitting wavelength and/or optical output power. Each light emitting element, photodetector element and each transparent optical element are typically arranged so that the optical axis of exit light from the light emitting element and the optical axis of incident light to the photodetector element substantially coincide on the partial reflective plane of the transparent optical device.

The optical pickup device having the above construction according to the invention can be used for both reading of and writing to different kinds of optical discs having different formats by designing its composite optical devices to have specifications in accordance with the different kinds of optical discs. Since the composite optical devices can be miniaturized, the optical pickup device also can be smallscaled. Moreover, since light emitting elements, photodetectors and transparent optical elements in the composite optical devices are previously adjusted in optical axis, etc., the optical pickup device can be assembled easily.

The composite optical device having the above construction according to the invention can be used for both writing to and reading of different kinds of optical discs having different formats by designing individual light emitting elements to have specifications in accordance with the different kinds of optical discs. Since the composite optical device can be miniaturized, a miniaturized optical pickup device can be made by using the optical pickup device. Moreover, since optical axes, etc. of light emitting elements, photodetectors and transparent optical elements in the composite optical devices can be adjusted easily like those of a conventional composite optical device having a single light emitting element, they can be assembled easily.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

Figure 1:
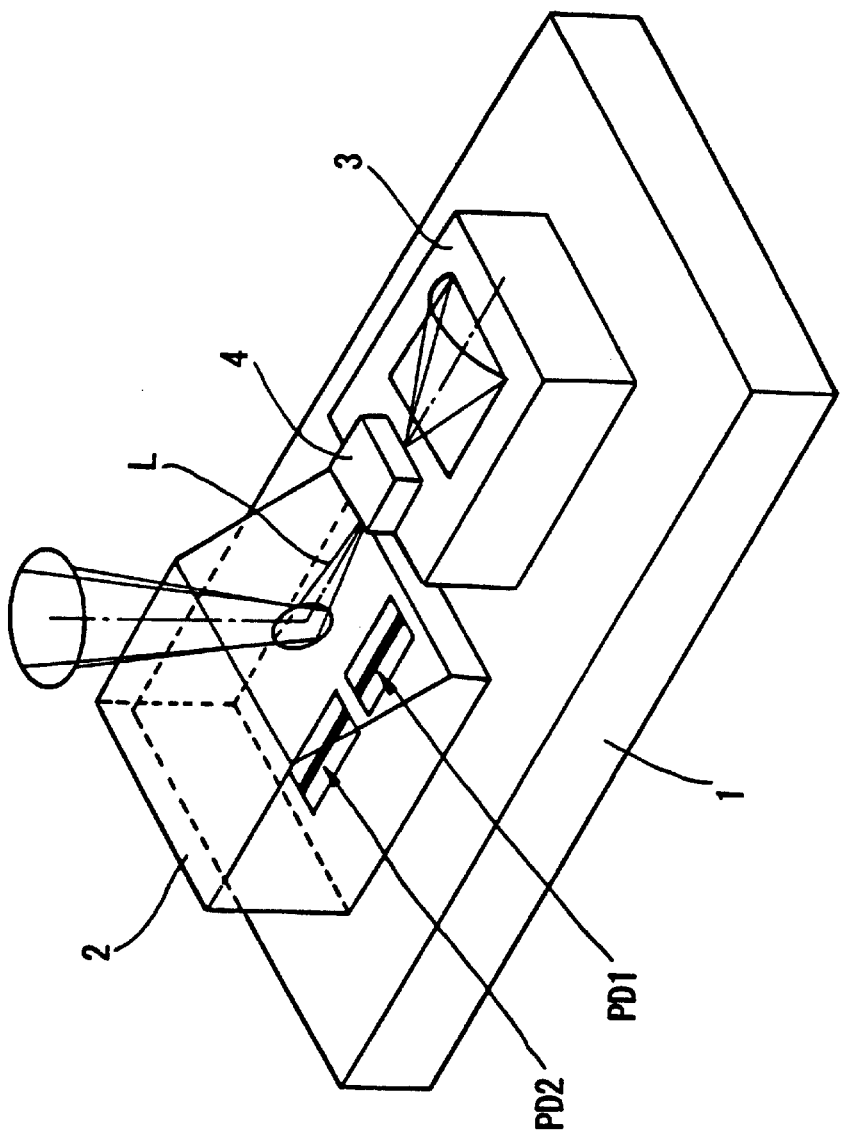
FIG. 1 is a perspective view showing a typical laser coupler used in an optical pickup device according to a first embodiment of the invention.

Embodiments of the invention are explained below with reference to the drawings. Identical or equivalent elements or parts are labeled with common reference numerals in all figures of the drawings. However, it should be noted that a laser coupler is a kind of a composite optical device.

Figure 2:
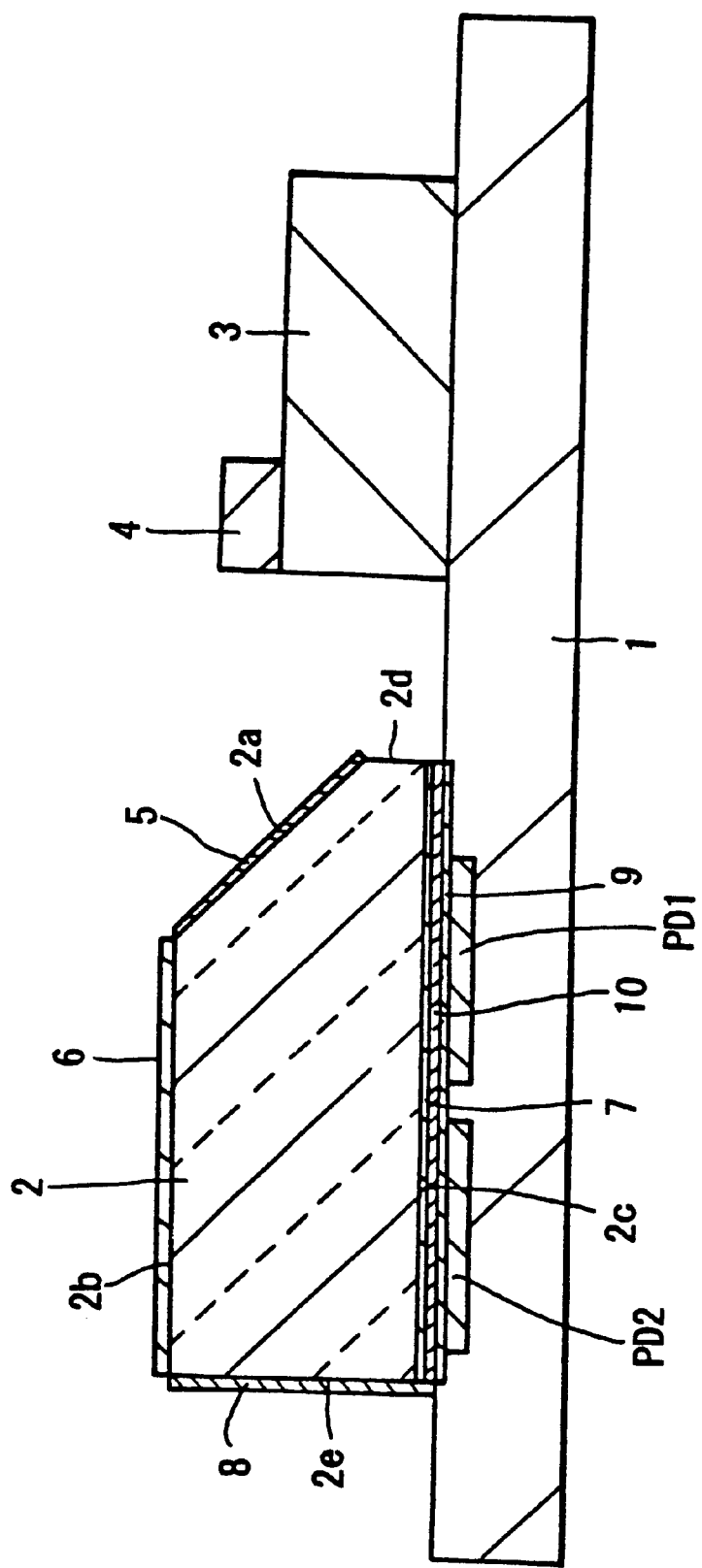
FIG. 2 is a cross-sectional view showing a typical laser coupler used in an optical pickup device according to the first embodiment of the invention.

FIGS. 1 and 2 show a laser coupler, which is a type of a composite optical device. FIG. 1 is a perspective view of the laser coupler, and FIG. 2 is a cross-sectional view of the laser coupler taken along its lengthwise direction.

As shown in FIGS. 1 and 2, the laser coupler includes a microprism 2 made from optical glass and a LOP (Laser On Photodiode) chip having a semiconductor laser 4 supported on a photodiode 3 which are mounted in close locations on a photodiode IC 1. The photodiode IC 1 incorporates a pair of photodiodes PD1, PD2 and other well known elements (not shown) such as a current-to-voltage converting amplifier, an operational processing circuit, and so on. The photodiode 3 is used to monitor optical outputs from the rear end surface of the semiconductor laser 4 and to control optical output power from the front end surface of the semiconductor laser 4. Since the semiconductor laser 4 is mounted so as to locate its junction downward in most cases, the photodiode 3 also functions to support the semiconductor laser 4 sufficiently high above the surface of the photodiode IC 1 to prevent that the laser beam emitted from the front end surface of the semiconductor laser 4 is reflected by the surface of the photodiode IC 1 and becomes noise light.

As shown in FIG. 2, the microprism 2 has a sloped surface 2a, a top surface 2b, a bottom surface 2c, and surfaces 2d and 2e. The sloped surface 2a has a half mirror 5, the top surface 2b has a total reflective film 6, the bottom surface 2c has an antireflection coating 7, the end surface 2d is a polished surface, and the end surface 2e has a light absorption film 8. A typical dimension of the microprism 2 is 0.6 mm in height, 1.52 mm in total length, 1.8 mm in width and 1.1 mm in length of the top surface 2b.

Further formed on the antireflection coating 7 on the bottom surface 2c of the microprism 2 is a silicon dioxide (SiO$_2$) film (not shown). On the other hand, formed on the photodiode PD1 of the photodiode IC 1 is a silicon nitride (SiN) film (not shown). Another SiO$_2$ film 9 overlies the SiN film and the photodiode PD2. The microprism 2 is mounted on the photodiode IC 1 by bonding the SiO film on the bottom surface 2c of the microprism 2 to the SiO$_2$ film 9 on the photodiode IC 1 with an adhesive 10. In this case, the SiN film on the photodiode PD 1 and the overlying portion of the SiO$_2$ film 9 form a half mirror. The SiO$_2$ film on the antireflection coating 7 reinforces the adhesive force of the microprism 2 by the adhesive 10. The SiO$_2$ film 9 passivates the surface of the photodiode IC 1 and reinforces the adhesive force of the microprism 2 by the adhesive 10.

Figure 3:
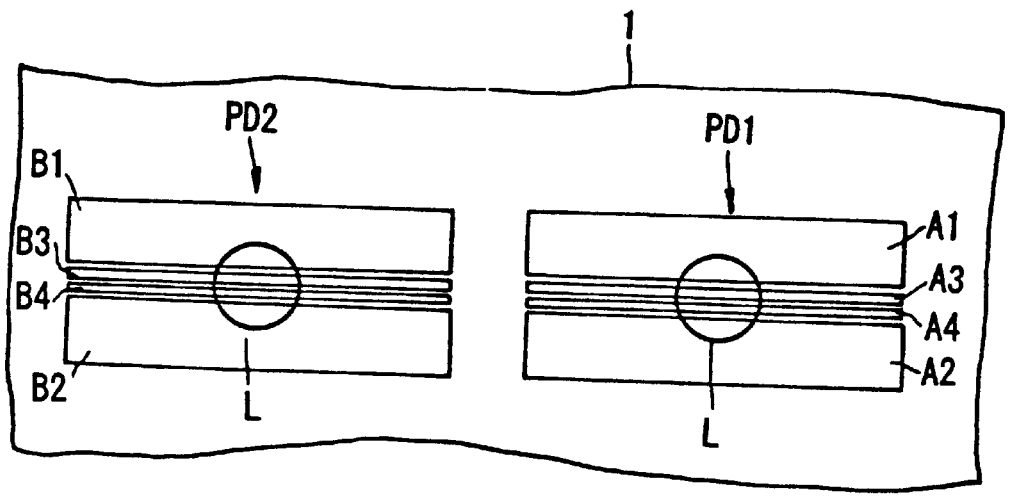
FIG. 3 is a plan view showing a pattern of photodiodes for detecting optical signals in the laser coupler shown in FIGS. 1 and 2.

The photodiodes PD1 and PD2 for detection of optical signals may be of a quarter divisional type. That is, as shown in FIG. 3, the photodiode PD1 has four photodiodes A1 to A4 separated from each other, and the photodiode PD2 has four photodiodes B1 to B4 separated from each other.

Figure 4:
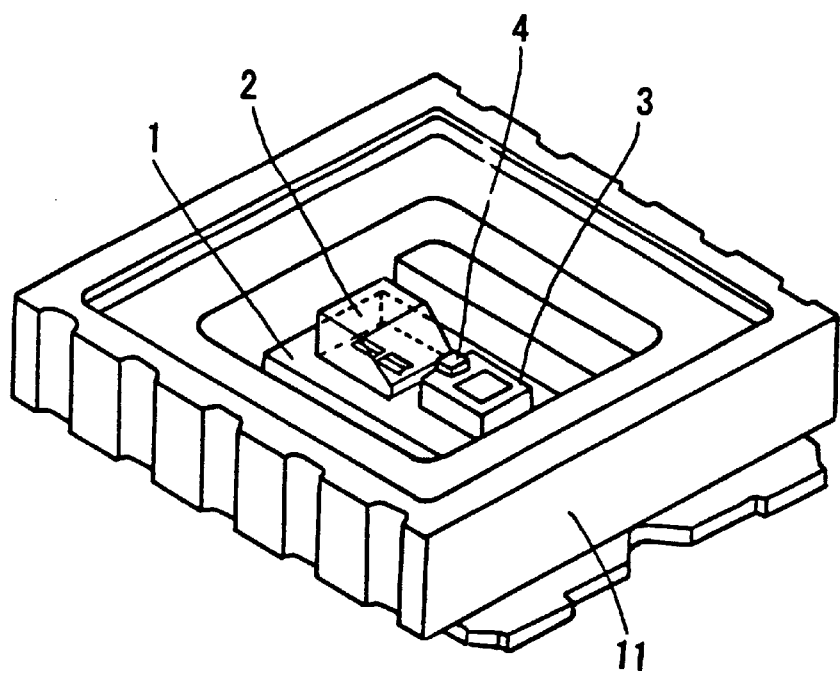
FIG. 4 is a perspective view showing a laser coupler packaged in a flat package.

As shown in FIG. 4, the laser coupler having the above construction is contained in a flat package 11, which may be made from ceramics, and is sealed by a window cap (not shown).

Figure 5:
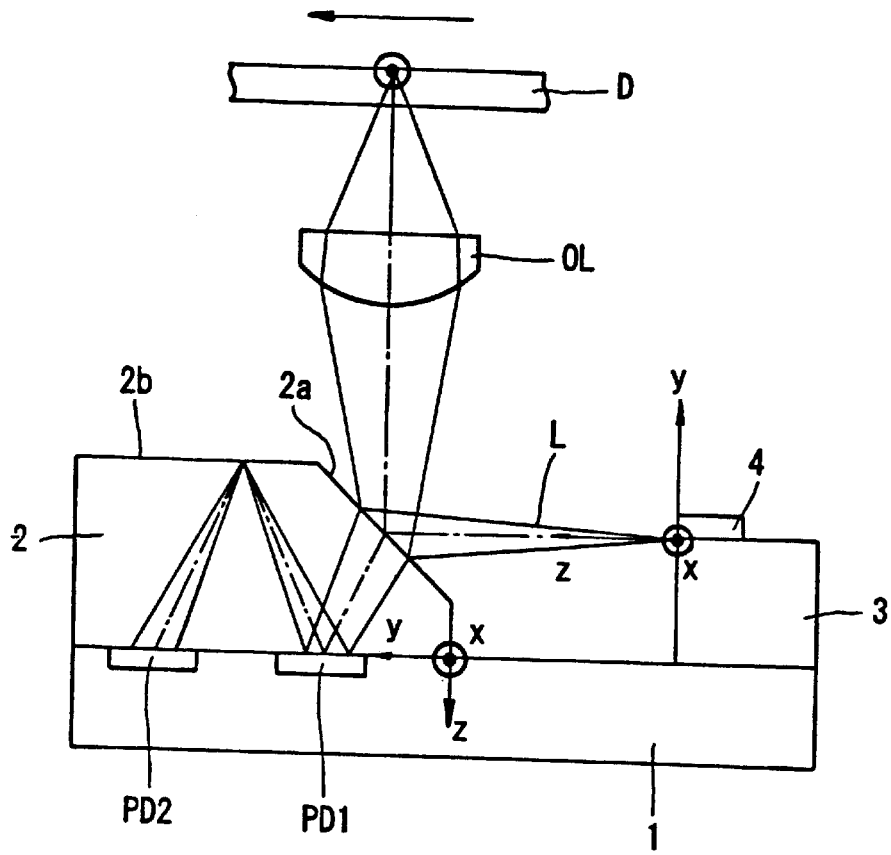
FIG. 5 is a schematic diagram for explaining behaviors when a laser coupler is applied to an optical pickup device.

Not explained are behaviors of the laser coupler with reference to FIG. 5. The laser light L emitted from the front end surface of the semiconductor laser 4 is reflected back by the half mirror (now shown) on the slope surface 2a of the microprism 2, then converged by the objective lens OL, and enters onto the optical disc D. The objective lens OL may be integral with or a separate body from the laser coupler. The laser light L reflected by the optical disc D enters into the interior of the microprism 2 through the half mirror on the slope surface 2a of the microprism 2. One half (50%) of the light entering into the microprism 2 enters into the photodiode PD1, and the other half (50%) is reflected by the half mirror on the photodiode PD1 and the top surface 2b of the microprism 2 successively, and then enters into the photodiode PD2.

Although the laser coupler is designed so that the spot size of the laser light L on the photodiode PD1 and that on the photodiode PD2 coincide when the laser light L is focalized onto the record plane of the optical disc D, these spot sizes on the photodiodes PD1 and PD2 gradually differ as the focalized position deviates from the record plane due to a movement of the optical disc D. Therefore, if any difference between an output signal from the photodiode PD1 and an output signal form the photodiode PD2 is regarded as a deviation in focalized position, a focus error signal can be detected. By determining the zero value of the focus error signal to indicate proper focalization on the optical disc D, namely, the just focus point, an actual focus error signal is fed back to the focus servo system to adjust subsequent focus error signals to zero. In this manner, proper focalization is maintained to ensure satisfactory record and reproduce operations of the optical disc D. In FIG. 3, the focus error signal is made from (A1+A2+B3+B4)−(A3+A4+B1+B2).

Based on the description made above, a first embodiment of the invention is explained below. In this embodiment, two laser couplers explained above are used to form an optical pickup device.

Figure 6:
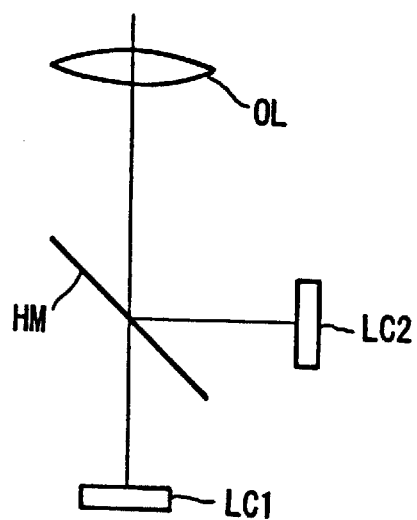
FIG. 6 is a schematic diagram showing a laser coupler according to the first embodiment of the invention.

FIG. 6 shows the optical pickup device according to the first embodiment of the invention.

As shown in FIG. 6, the optical pickup device according to the first embodiment is made up of two laser couplers LC1 and LC2, half mirror HM and objective lens OL. The laser couplers LC1 and LC2 may have the construction shown in FIGS. 1 and 2, for example. In this case, the laser coupler LC1 is disposed to share a common optical axis with the half mirror HM and the objective lens OL. The laser coupler LC2 is disposed to substantially coincide its incident or exit optical axis with the incident or exit optical axis of the laser coupler LC1 on the half mirror HM. The half mirror HM preferably has a polarizing function to polarize laser beams from the laser couplers LC1 and LC2 into different polarized beams to attain the maximum use of light.

In the first embodiment, the laser coupler LC1 is designed in accordance with an optimum specification for record and reproduce of a particular kind of optical discs having a particular format. That is, the light emitting wavelength and/or optical output power of its semiconductor laser 4, photodetective properties of the photodiodes PD1 and PD2, and so forth, are optimized for the particular optical disc. On the other hand, the laser coupler LC2 is designed in accordance with an optimum specification for record and reproduce of another kind of optical discs having a format different from the former one. That is, the light emitting wavelength and/or optical output power of the semiconductor laser 4, photodetective characteristics of the photodiodes PD1 and PD2, etc. are optimized for the other kind of optical disc.

Usable as the semiconductor laser 4 are, e.g., a semiconductor laser for light emitting wavelength in the band of 780 nm and optical output power of several milliwatt, a semiconductor laser for light emitting wavelength in the band of 780 nm and optical output power of decades of milliwatt, a semiconductor laser for emitting red light (light emitting wavelength in the band of 635 to 680 nm, approximately) and optical output power of several milliwatt, a semiconductor laser for emitting red light (light emitting wavelength around 635 to 680 nm) and optical output power of decades of milliwatt, a semiconductor laser for emitting blue light (light emitting wavelength around 500 nm) and optical output power of several milliwatt, and a semiconductor laser for emitting blue light (light emitting wavelength around 500 nm) and optical output power of several milliwatt. Clearly, a laser is selected depending on the purpose.

Since the optical pickup device according to the first embodiment has the laser couplers LC1 and LC2 having optimum specifications for recording onto and reproducing from two kinds of optical discs in different formats, the optical pickup device is available for recording onto and reproducing from two kinds of optical discs in different formats by selectively using one of these laser couplers LC1 and LC2 depending on the format of an optical disc to be recorded or reproduced. Since these laser couplers LC1 and LC2 can be miniaturized, the optical pickup device can be small-scaled. Moreover, since the semiconductor lasers 4, photodiodes PD1, PD2, and microprisms 2 are previously adjusted in optical axis, etc., the optical pickup device can be assembled easily.

Figure 7:
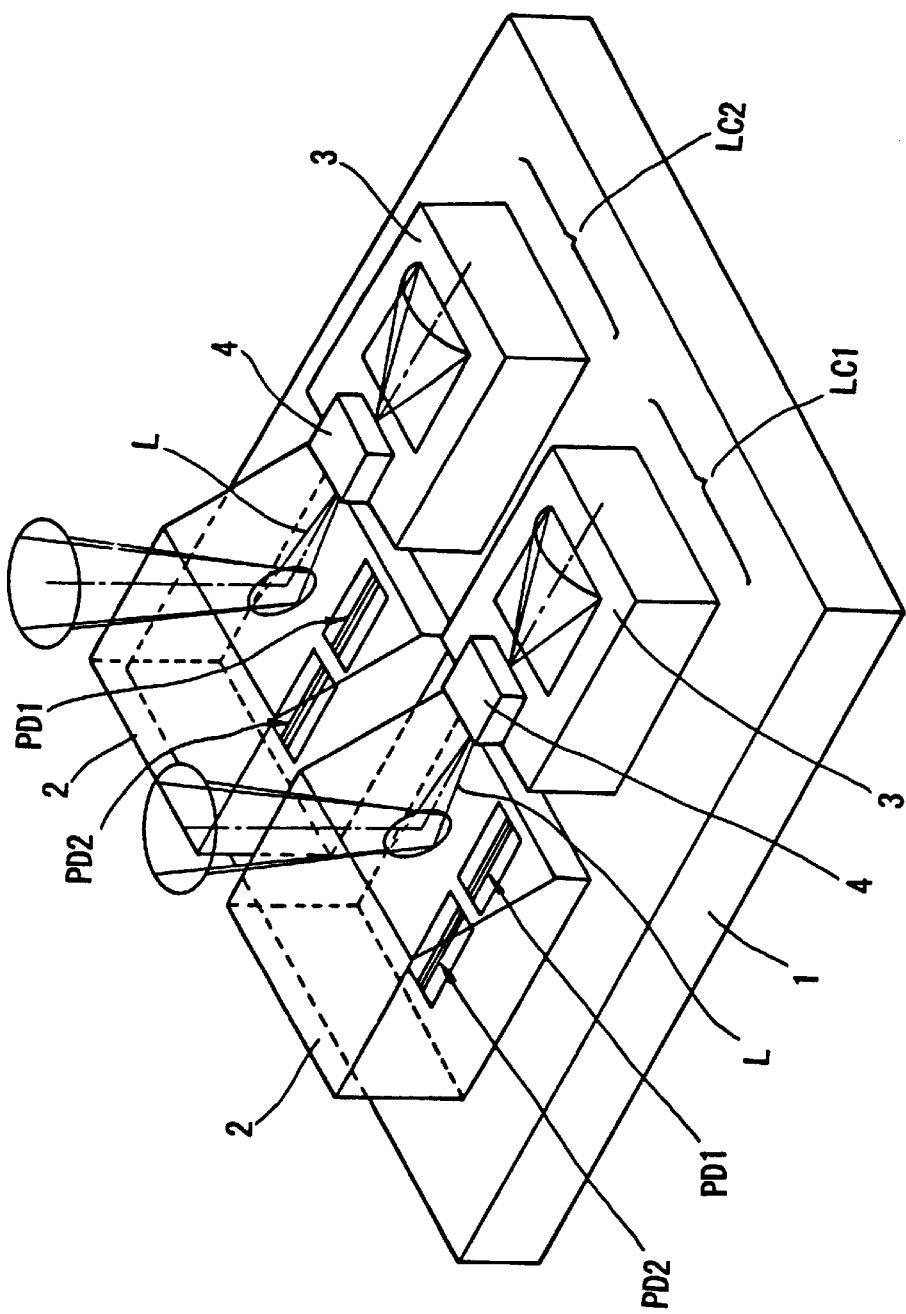
FIG. 7 is a perspective view showing a laser coupler according to a second embodiment of the invention.

FIG. 7 shows a laser coupler taken as a second embodiment of the invention, which is used in an optical pickup device.

As shown in FIG. 7, the laser coupler according to the second embodiment includes two laser couplers LC1 and LC2 having the same construction shown in FIGS. 1 and 2 and supported in close locations on a common photodiode IC 1 to orient their optical axes in parallel with each other. Like those in the first embodiment, the laser couplers LC1 and LC2 are indivdually designed in optimum specifications each for record and reproduce of one kind of optical discs in a particular format.

The distance between the LOP chip of the laser coupler LC1 and the LOP chip of the laser coupler LC2 is typically around 500 um, and 30 to 400 um in minimum, although depending on the mounting accuracy of these LOP chips.

When an optical pickup device is made by using the laser coupler according to the second embodiment, the objective lens may be an integral body with or a separate body from the laser coupler. The laser couplers LC1 and LC2 can commonly use a single objective lens.

Also the second embodiment has the same advantages as those of the first embodiment. That is, when the laser coupler according to the second embodiment is used in an optical pickup device, the optical pickup device is available for recording on and reproducing from two kinds of optical discs in different formats by selectively using one of these laser couplers LC1 and LC2 depending on the format of an optical disc to be recorded or reproduced.

Additionally, since the laser couplers LC1 and LC2 are incorporated into the common photodiode IC 1, the optical pickup device can be miniaturized and can be fabricated economically because a single photodiode IC 1 and a single package are sufficient to make up the optical pickup device. Moreover, adjustment of optical aces upon incorporating the laser couplers LC1 and LC2 on the photodiode IC 1 is relatively easy, like the laser coupler shown in FIGS. 1 and 2.

Since the semiconductor lasers 4, photodiodes PD1, PD2 and microprisms 2 are previously adjusted in optical axis, etc., the optical pickup device can be assembled easily.

Figure 8:
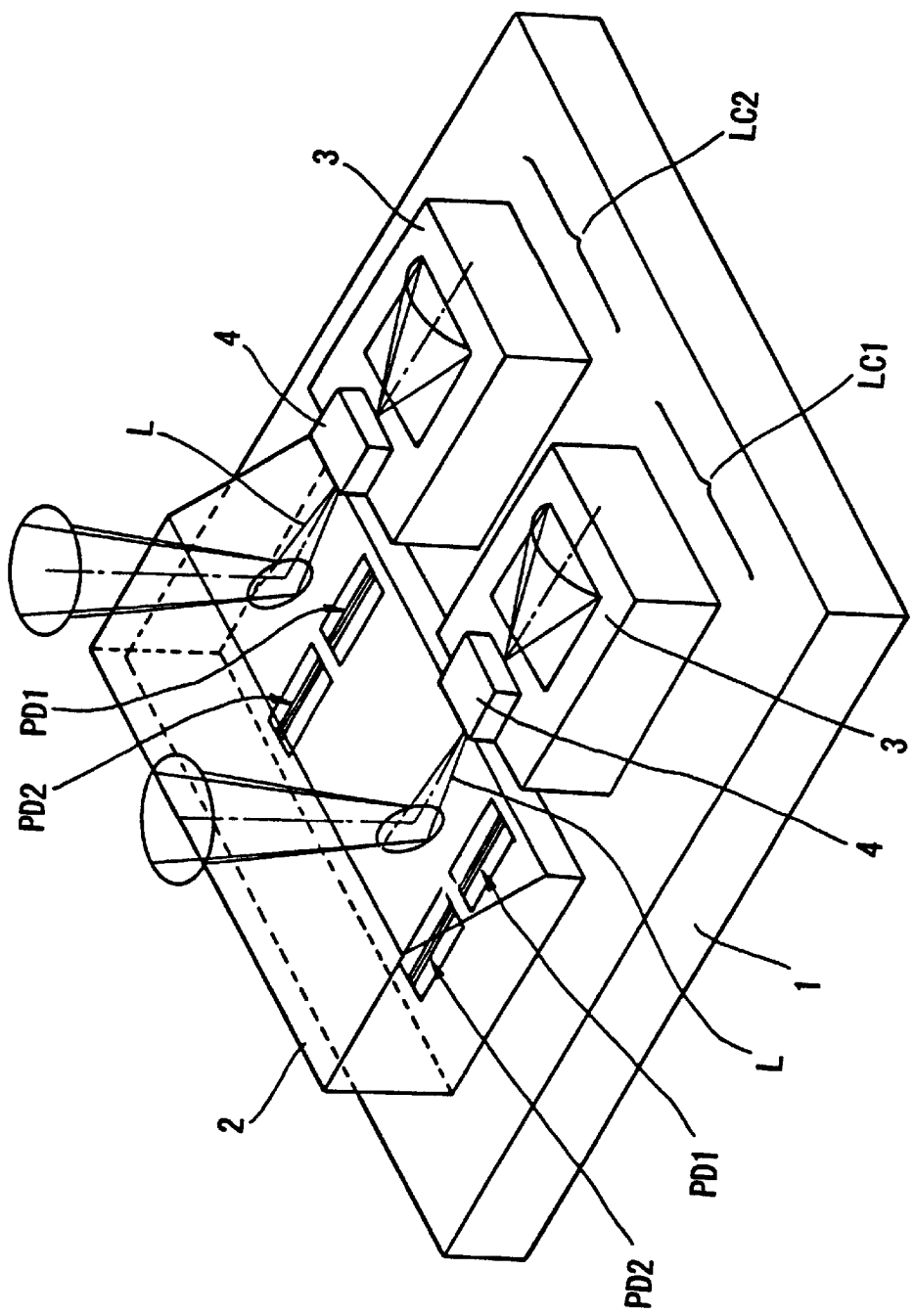
FIG. 8 is a perspective view showing a laser coupler according to a third embodiment of the invention.

FIG. 8 shows a laser coupler taken as a third embodiment of the invention, which is used in an optical pickup device.

As shown in FIG. 8, in the laser coupler according to the third embodiment, a single common microprism is used for both laser couplers LC1 and LC2. A single sloped surface 2a is used by both laser couplers LC1 and LC2. In the other aspects, the third embodiment is the same as the laser coupler of the second embodiment, and its explanation is omitted here.

Here again, when an optical pickup device is made by using the laser coupler according to the third embodiment, the objective lens may be an integral body with or a separate body from the laser coupler, and the laser couplers LC1 and LC2 can commonly use a single objective lens.

Also the third embodiment has the same advantages as those of the second embodiment.

Figure 9:
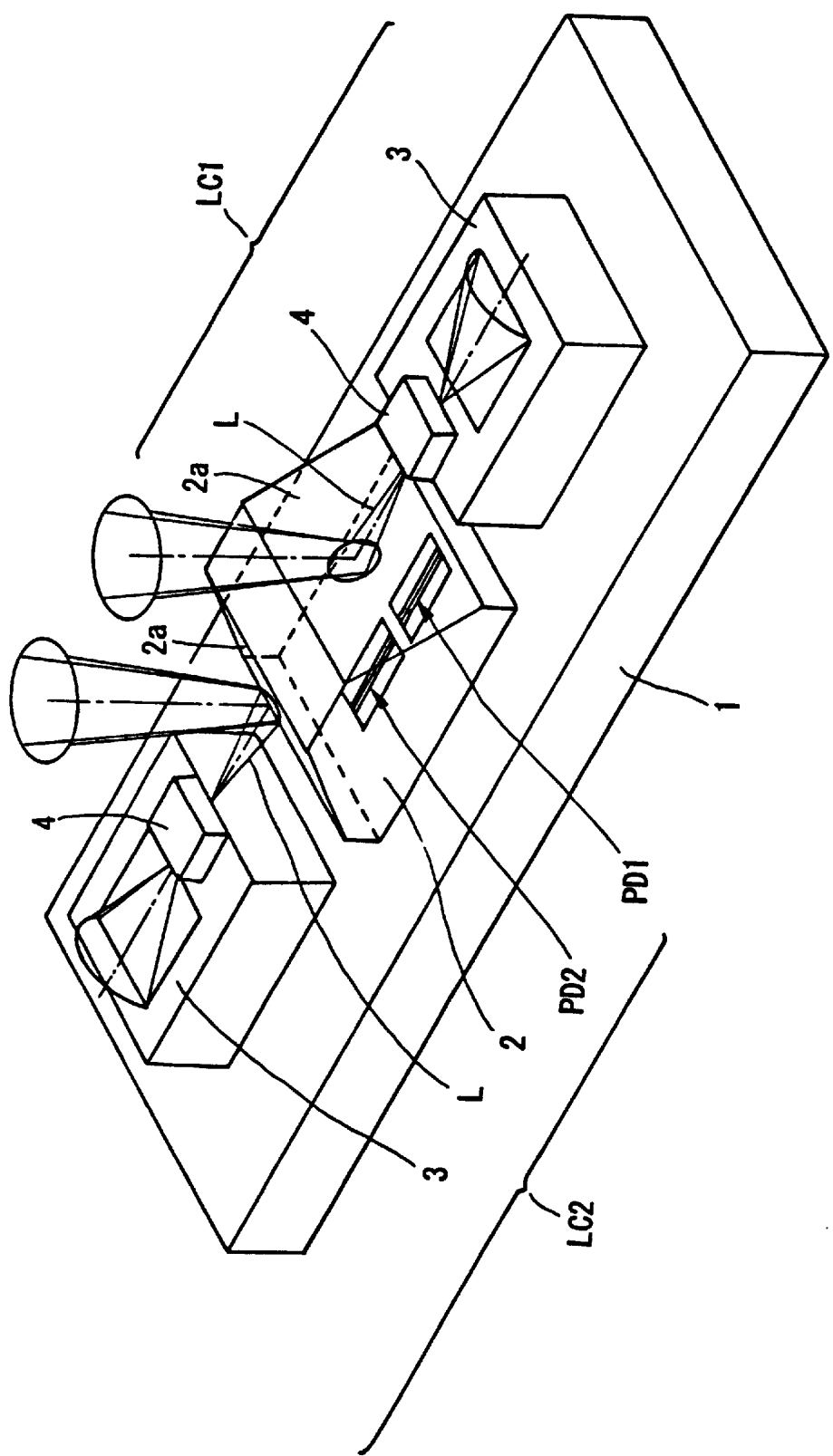
FIG. 9 is a perspective view showing a laser coupler according to a fourth embodiment of the invention.

FIG. 9 shows a laser coupler taken as a fourth embodiment of the invention, which is used in an optical pickup device.

As shown in FIG. 9, in the laser coupler according to the fourth embodiment, two laser couplers LC1 and LC2 are incorporated in a face-to-face relationship on a common photodiode IC 1 or share common signal detecting photodiodes PD1 and PD2, common microprism 2, and a common optical axis. In this case, the microprism 2 has two oppositely positioned sloped surfaces 2a for receiving incident light, which are slanting down toward respective LOP chips of the microprisms 2, respectively.

In the other aspects, the laser coupler according to the fourth embodiment is the same as the laser coupler according to the second embodiment, and its explanation is omitted here.

In the fourth embodiment, a typical distance between a laser beam L emitted from one of the semiconductor laser 4 and reflected by one of the slope surfaces 2a of the microprism 2 and another laser beam L emitted from the other semiconductor laser 4 and reflected by the other slope surface 2a is about 1 mm.

Here again, when an optical pickup device is made by using the laser coupler according to the fourth embodiment, the objective lens may be integral with or separate from the laser coupler, and both laser couplers LC1 and LC2 may share a common objective lens.

Also the fourth embodiment has the same advantages as those of the second embodiment. In this case, because the laser couplers LC1 and LC2 share the common photodiodes PD1 and PD2 and the common microprism 2, the photodiode IC 1 can be miniaturized more, and also the optical pickup device can be small-scaled more.

Figure 10:
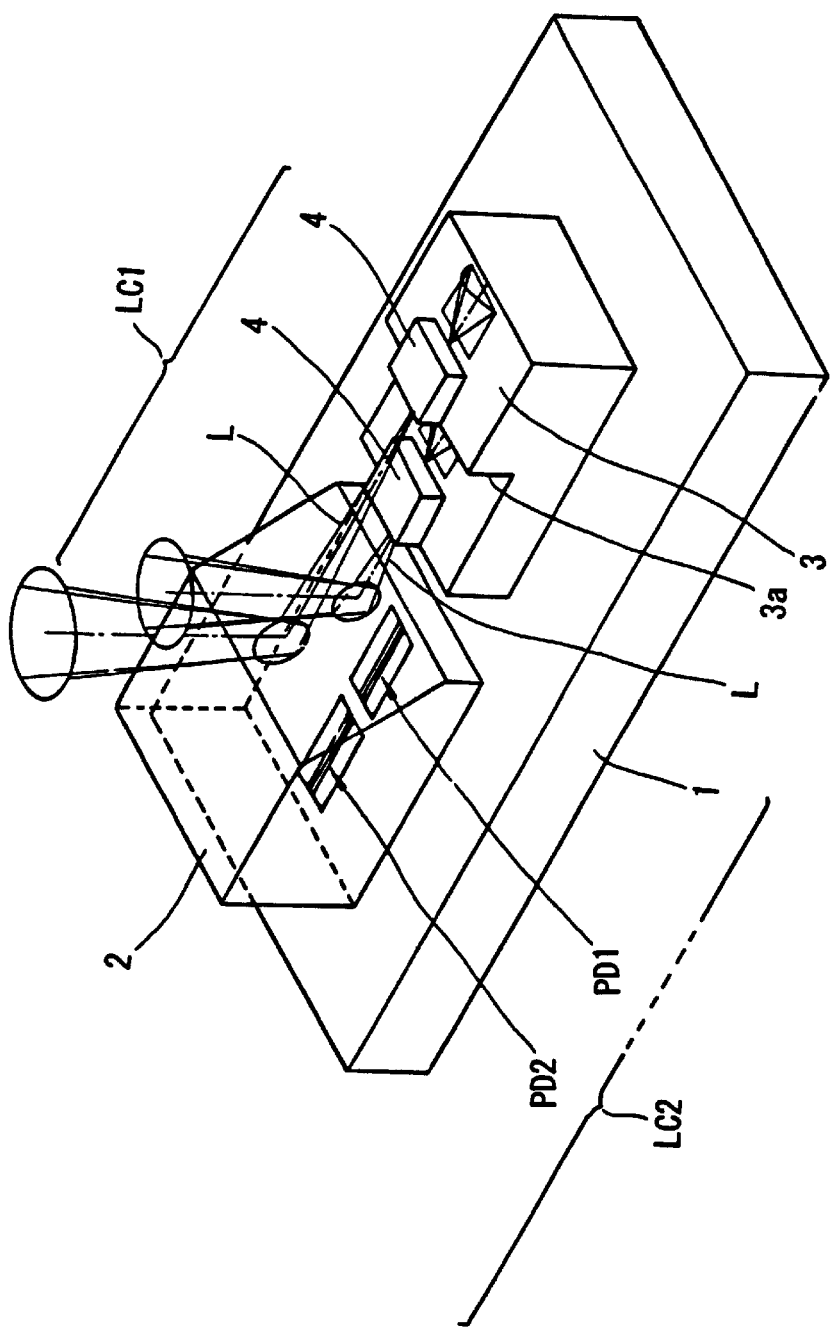
FIG. 10 is a perspective view showing a laser coupler according to a fifth embodiment of the invention.

FIG. 10 shows a laser coupler taken as a fifth embodiment of the invention, which is used in an optical pickup device.

As shown in FIG. 10, in the laser coupler according to the fifth embodiment, two semiconductor lasers 4 different in light emitting wavelength and/or optical output power from each other are incorporated on a single LOP chip. More specifically, a photodiode chip 3 has a two-step top surface 3a. Formed on a lower step of the two-step top surface a is a semiconductor laser 4 designed for optimum light emitting wavelength and/or optical output power for writing to and reading from the same kind of discs in a particular format. Formed on the higher step of the two-step top surface 3a is another semiconductor laser 4 designed for optimum light emitting wavelength and/or optical output power for write and read of different kinds of optical discs in different formats. The height of the step portion 3a is large enough to prevent interference between laser beams L emitted from the front end surface of both semiconductor lasers 4.

In the other aspects, the fifth embodiment is the same as the laser coupler according to the second embodiment, and its explanation is omitted here.

Here again, when an optical pickup device is made by using the laser coupler according to the fifth embodiment, the objective lens may be integral with or separate from the laser coupler, and both laser couplers LC1 and LC2 may share a common objective lens.

Also the fifth embodiment has the same advantages as those of the second embodiment. In this case, because the laser couplers LC1 and LC2 share the common photodiodes PD1 and PD2, the common microprism 2 and the common microprism sloped surface 2a, the photodiode IC 1 can be miniaturized more, and also the optical pickup device can be small-scaled more.

Figure 11:
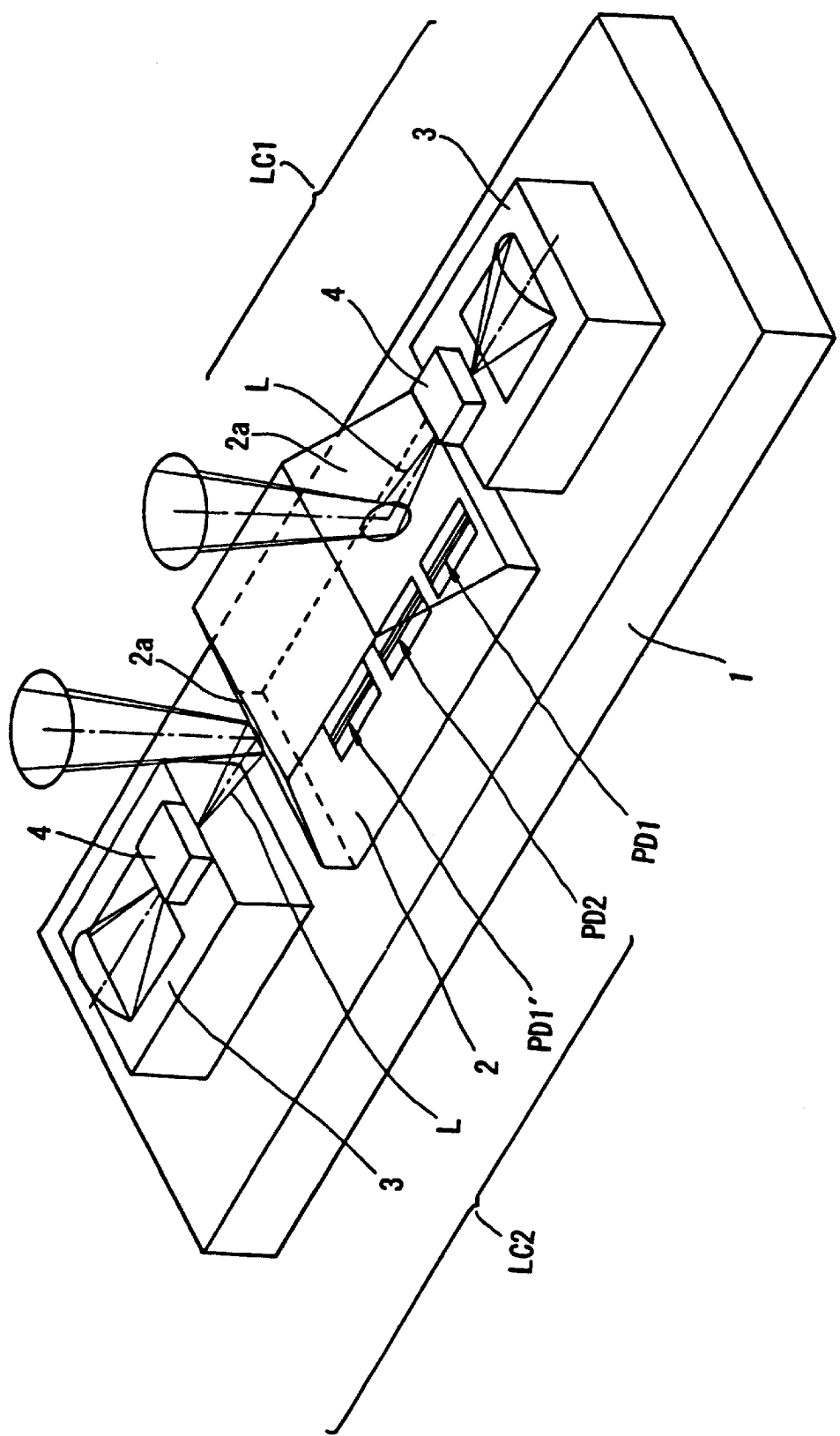
FIG. 11 is a perspective view showing a laser coupler according to a sixth embodiment of the invention.

FIG. 11 shows a laser coupler taken as a sixth embodiment of the invention, which is used in an optical pickup device.

As shown in FIG. 11, in the laser coupler according to the sixth embodiment, two laser couplers LC1 and LC2 are incorporated in a face-to-face relationship on a common photodiode IC 1 to share the common photodiodes PD1, PD2 or PD1' for detecting optical signals (in this case, the photodiode PD2), the common microprism 2, and a common optical axis. In this case, the laser coupler LC1 uses the photodiodes PD1 and PD2 to detect optical signals, and the laser coupler LC2 uses the photodiodes PD1' and PD2 to detect optical signals. In the other respects, the sixth embodiment is the same as the laser coupler according to the second embodiment, and its explanation is omitted here.

Here again, when an optical pickup device is made by using the laser coupler according to the sixth embodiment, the objective lens may be integral with or separate from the laser coupler, and both laser couplers LC1 and LC2 may share a common objective lens. Also the sixth embodiment has the same advantages as those of the second embodiment.

Although the invention has been explained by way of some embodiments, the invention is not limited to the illustrated examples, but involves various changes or modifications within the spirit and scope of the invention.

For example, numerical values and materials indicated in the explanation of embodiments are only examples, and different numerical values and materials may be used in the invention.

In the first embodiment, the half mirror may be replaced by a polarizing beam splitter, for example, and the objective lens OL may be made as a separate body from the optical pickup device.

Although the fourth embodiment has been explained as the laser couplers LC1 and LC2 sharing common photodiodes PD1, PD2 and a common microprism 2, and the sixth embodiment has been explained as the laser coupler LC1 or LC2 sharing a common photodiode PD2 and a common microprism 2, a pair of photodiodes PD1 and PD2 may be provided for laser couplers LC1 and LC2 to share a common optical axis, so that the laser coupler LC1 and LC2 share only the microprism 2.

In the first to sixth embodiments, although two laser couplers LC1 and LC2 are incorporated on a common photodiode IC 1 to make up a single laser coupler, three or more laser couplers may be incorporated on a common photodiode IC 1 to form a single laser coupler.

Figure 12:
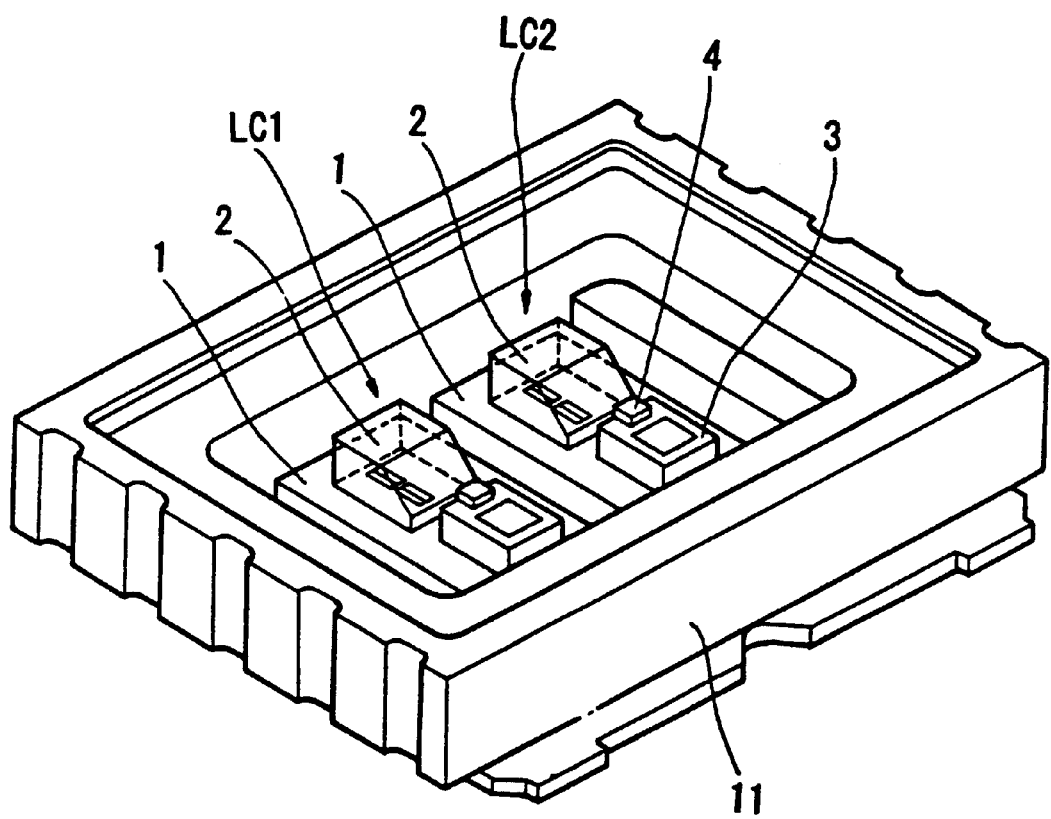
FIG. 12 is a perspective view showing a laser coupler according to another embodiment of the invention.

Also when two laser couplers LC1 and LC2 on common substrate 12 are mounted in a parallel alignment in the lateral direction in a common flat package 11, as shown in FIG. 12, and the package 11 is used in an optical pickup device, the same advantages as those of the above embodiments can be obtained. Here again, both laser couplers LC1 and LC2 can use a common objective lens. However, taking the lens field into account, the laser couplers LC1 and LC2 are preferably mounted in close locations up to 100 um, for example. Alternatively, these laser couplers LC1 and LC2 may be arranged in a serial alignment within the common flat package 11. Moreover, three or more laser couplers may be mounted in a common flat package 11.

Figure 13:
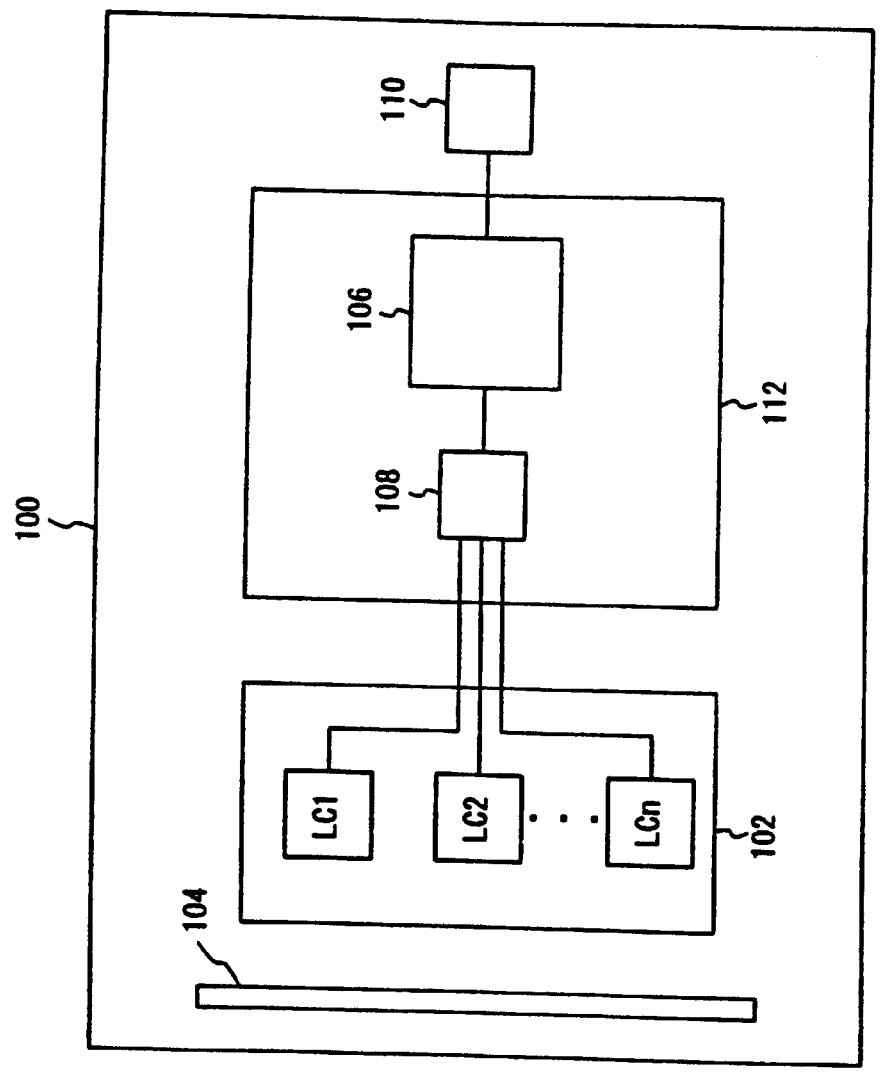
FIG. 13 schematically illustrates an optical disc system employing principles of the invention.

In FIG. 13, there is schematically illustrated an optical disc system 100 employing anyone of the previously discussed optical devices of the invention. As illustrated, in the optical system 100, an optical device 102 can be employed in which laser coupler LC1, LC2 to LCn are used to read from and write to an optical recording medium 104 (appropriately supported and driven by well known means not illustrated here).

As illustrated, appropriately associated with the optical device 102 is circuitry 106 for driving the laser couplers LC1 to LCn in accordance with well known technology. Additionally, there is provided a selector 108 to switch between the laser couplers LC1 to LCn as necessary. The selector 108 can take many forms, including a circuit driven by an electronic signal from the driver circuitry 106. A switch 110 may be coupled to the circuitry 106 to enable manual selection of a laser coupler, and, therefore, a format, by a user. Otherwise, the selection may be accomplished automatically by reading information stored on the optical recording medium 104 with one or more of the laser couplers. It is believed that such techniques could be readily implemented by those of ordinary skill in the art.

As illustrated, the selector 108 and driver circuitry 106 may be provided as part of overall circuitry 112 used to operate the optical disc system 100. Such circuitry 112, apart from the inclusion of a selector 108 and the switch means 110 should be well known in the art.

As described above, the optical pickup devices according to the invention are available for writing to and reading from different kinds of optical discs in different formats from each other, and promises miniaturization and easy assembly thereof because the include a plurality of composite optical devices having different read/write specifications.

Because the composite optical devices according to the invention have light emitting elements with different read/write specifications, an optical pickup device using the composite optical devices is available from writing to and reading from different kinds of optical discs of different read/write formats, and can be miniaturized and assembled easily.

Also, it will be readily understood by those of ordinary skill in the art how the various embodiments described above can be modified and/or combined to include more than two laser photocouplers to enable read/write interaction with recording media with more than two-read/write formats.

Although modifications and changes may be suggested by those skilled in the art, it is the intention of the inventors to embody within the patent warranted hereon all changes and modifications as reasonably and properly come within the scope of their contribution to the art.

What is claimed is:

1. A composite optical device comprising:
   a first light emitting element having a first read/write specification;
   a second light emitting element having a second read/write specification different than the first read/write specification;
   a photodetector element;
   an optical element including a partially reflective plane disposed to reflect light from at least one of the first and second light emitting elements; and
   a base body supporting the light emitting elements, the photodetector element and the optical element, with the optical element covering the photodetector element,
   wherein the first and second read/write specifications are selected from a group consisting of CD, CD-R, and DVD read/write specifications.

2. A composite optical device according to claim 1, wherein the first and second light emitting elements share a common optical axis.

3. A composite optical device according to claim 1, wherein the first and second read/write specifications comprise at least one wavelength selected from the range of 500 nm through 780 nm.

4. A composite optical device according to claim 1, wherein the first and second read/write specifications are selected from a group consisting of CD, CD-R, MD, MO, Phase Change Disc, and DVD read/write specifications.

5. An optical memory system comprising
   a first light emitting element having a first read/write specification;
   a second light emitting element having a second read/write specification different than the first read/write specification;
   a driver circuit for the first and second light emitting elements;
   a selector coupled to the first and second light emitting elements and the driver circuit for switching between the first and second light emitting elements; and
   an optical element including a partially reflective plane disposed to reflect light from at least one of the first and second light emitting elements toward an optical recording medium, the optical element supported by a base and covering a photodetector.

6. An optical memory system according to claim 5, wherein the first and second light emitting elements are disposed at different heights above the base body.

7. An optical memory system according to claim 5, wherein the first and second light emitting elements are disposed in an over-and-under relationship.

8. An optical memory system according to claim 5, wherein the first and second light emitting elements share a common optical axis.

9. An optical memory system according to claim 5, wherein the first and second read/write specifications are selected from a group consisting of CD, CD-R, MD, MO, Phase Change Disc, and DVD read/write specifications.

10. An optical memory system according to claim 6, wherein the first and second read/write specifications are selected from a group consisting of CD, CD-R, MD, MO, Phase Change Disc, and DVD read/write specifications.

11. An optical memory system according to claim 7, wherein the first and second read/write specifications are selected from a group consisting of CD, CD-R, MD, MO, Phase Change Disc, and DVD read/write specifications.

12. An optical memory system according to claim 8, wherein the first and second read/write specifications are selected from a group consisting of CD, CD-R, MD, MO, Phase Change Disc, and DVD) read/write specifications.

13. An optical memory system according to claim 5, wherein the first and second read/write specifications comprise at least one wavelength selected from the range of 500 nm through 780 mn.

14. An optical memory system according to claim 6, wherein the first and second read/write specifications comprise at least one wavelength selected from the range of 500 nm through 780 mn.

15. An optical memory system according to claim 7, wherein the first and second read/write specifications comprise at least one wavelength selected from the range of 500 nm through 780 nm.

16. An optical memory system according to claim 8, wherein the first and second read/write specifications comprise at least one wavelength selected from the range of 500 nm through 780 nm.

17. An optical memory system according to claim 5, wherein the partially reflective plane is disposed on a first side of the optical element, and wherein the optical element includes an additional partially reflective plane on a second side of the optical element.

18. An optical memory system according to claim 17, wherein the first partially reflective plane is disposed to reflect light from the first light emitting element and wherein the second partially reflective plane is disposed to reflect light from the second light emitting element.

19. A method for transferring data between optical recording media of different formats, the method comprising:
   selecting between a first light emitting element having a first read/write specification and a second light emitting element having a second read/write specification, thereby establishing a selected light emitting element;
   driving the selected light emitting element so that it emits light toward au optical element supported by a base body and covering a photodetector;
   reflecting light from a partially reflective plane of the optical element toward an optical recording medium; and
   reading data returned from the optical recording medium through the optical element using the photodetector.

20. A method according to claim 19, wherein selecting comprises selecting between first and second light emitting elements disposed at different heights above the base body.

21. A method according to claim 19, wherein selecting comprises selecting between fist and second light emitting elements sharing a common optical axis.

22. A method according to claim 19, wherein the first and second read/write specifications are selected from a group consisting of CD, CD-R, MD, MO, Phase Change Disc, and DVD read/write specifications.

23. A method according to claim 20, wherein the first and second read/write specifications are selected from a group consisting of CD, CD-R, MD, MO, Phase Change Disc, and DVD ranite specifications.

24. A method according to claim 21, wherein the first and second read/write specifications are selected from a group consisting of CD, CD-R, MD, MO, Phase Change Disc, and DVD) A the specifications.

25. A method according to claim 19, wherein tie first and second read/write specifications comprise at least one wavelength selected from the range of 500 nm through 780 nm.

26. A method according to claim 20, wherein the first and second read/write specifications comprise at least one wavelength selected from the range of 500 nm through 780 nm.

27. A method according to claim 21, wherein the first and second read/write specifications comprise at least one wavelength selected from the range of 500 nm through 780 nm.

28. A method according to claim 19, wherein the partially reflective plane is disposed on a first side of the optical element, and wherein the optical element includes an additional partly reflective plane on a second side of the optical element.

29. A method according to claim 28, wherein the first partially reflective plane is disposed to reflect light from the first light emitting element and wherein the second partially reflective plane is disposed to reflect light from the second light emitting element.

* * * * *